Oct. 31, 1967 G. F. REMPFER 3,350,640
ELECTRON DIFFRACTION VOLTMETER
Filed Dec. 23, 1963 2 Sheets-Sheet 2

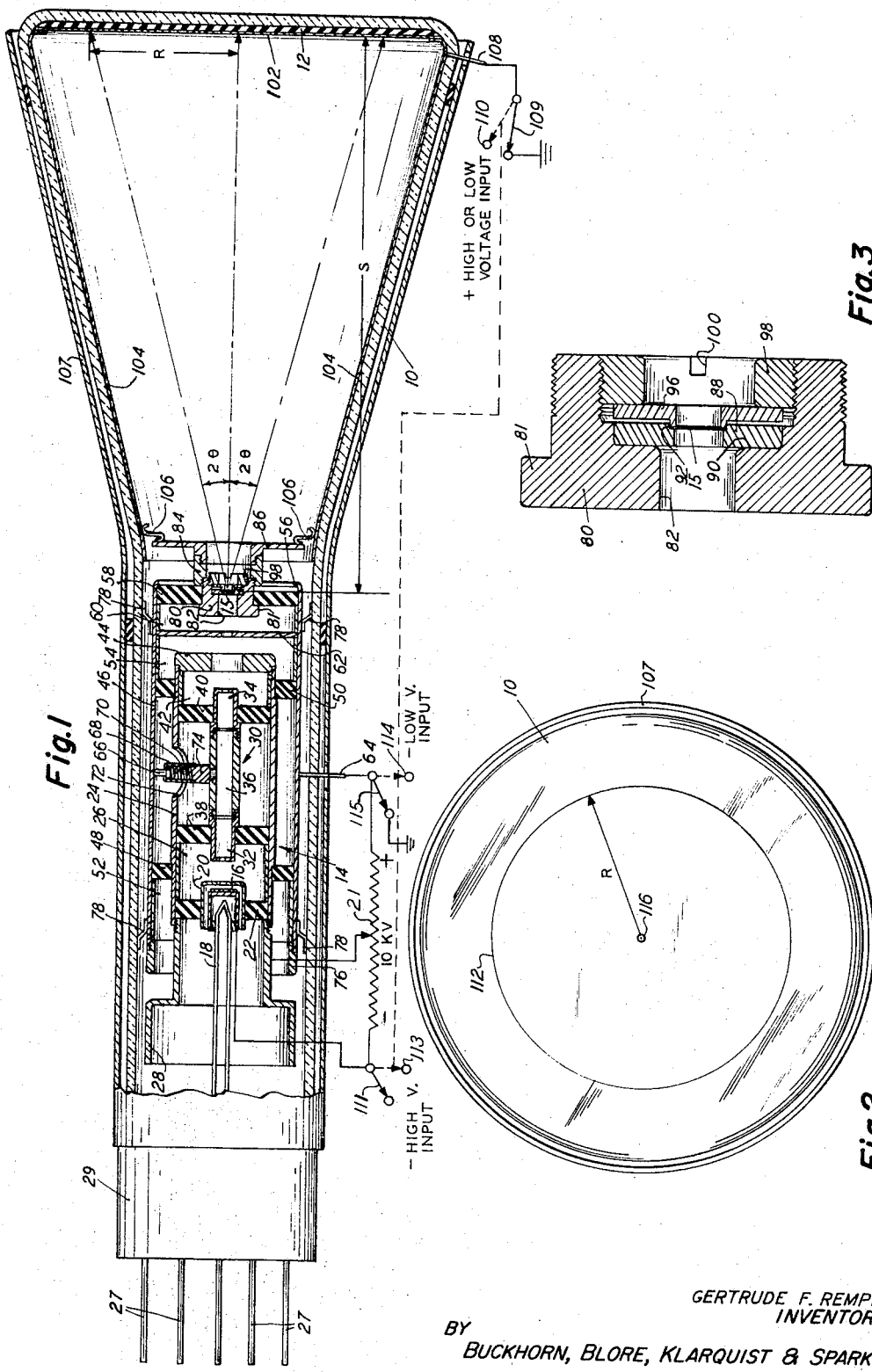

GERTRUDE F. REMPFER
INVENTOR
BY
BUCKHORN, BLORE, KLARQUIST & SPARKMAN
ATTORNEYS

# United States Patent Office 3,350,640
Patented Oct. 31, 1967

3,350,640
ELECTRON DIFFRACTION VOLTMETER
Gertrude F. Rempfer, Rte. 1, Box 268–B,
Forest Grove, Oreg. 97116
Filed Dec. 23, 1963, Ser. No. 332,422
8 Claims. (Cl. 324—121)

ABSTRACT OF THE DISCLOSURE

The subject matter of the present invention relates generally to apparatus for measuring high D.C. voltages, and in particular to an electron diffraction voltmeter which measures an unknown D.C. input voltage by means of a diffraction member which changes the direction of a portion of an electron beam in a cathode ray tube through a diffraction angle related to the velocity of the electrons striking such diffraction member. The input voltage is applied to either the diffraction member or the source of electrons, or between them, so that the velocity of the electrons and therefore their diffraction angle is proportional to such input voltage. The value of the input voltage is determined by measuring the diffraction distance of the electron beam on the fluorescent screen of the cathode ray tube.

---

Briefly, one embodiment of the diffraction voltmeter of the present invention may be in the form of a cathode ray tube having a polycrystalline metal foil diffraction member mounted between the electron gun and the fluorescent screen of such tube so that the electron beam emitted by the cathode of such gun passes through such diffraction member before it strikes the phosphor screen. A portion of such beam is diffracted or changed in direction by the diffraction member to produce a light image on the fluorescent screen of the diffraction pattern of such diffraction member which, in the case of polycrystalline material, is a plurality of annular, concentric diffraction rings. The D.C. voltage to be measured may be applied between the diffraction member and the cathode to change the velocity of the electrons passing through such diffraction member so that the wave length of such electrons changes. As a result the electrons are diffracted through different diffraction angles depending upon the magnitude of such D.C. voltage so that the diameters of the diffraction rings produced on the fluorescent screen vary in accordance with such voltage to indicate the amplitude of such voltage. A thin, light reflecting coating of metal may be provided over the rear surface of the fluorescent screen to increase the brightness of the light image produced on such screen. This coating is electrically connected to the same voltage as the diffraction member by means of a wall coating of conductive material on the inner surface of the tube envelope so that the region between such diffraction member and such fluorescent screen has substantially no electrical field therein. This field-free region allows the diffracted electrons to be transmitted in substantially straight lines from the diffraction member to the fluorescent screen so that the square of the radius of the diffraction rings produced on such screen is inversely proportional to the D.C. voltage applied to such diffraction member.

The electron diffraction voltmeter of the present invention has several advantages over conventional high voltage D.C. voltmeters for measuring voltages of about 10 to 50 kilovolts including a simpler structure which is less expensive to manufacture. In addition, the present diffraction voltmeter is more accurate than previous voltmeters operating in the high voltage range since its accuracy is only limited by the degree of accuracy with which the radius of the diffraction ring is measured. Also, the diffraction voltmeter requires no calibration by the operator to maintain its accuracy. Another advantage of the present diffraction voltmeter over conventional voltmeters is that it has no moving parts and therefore provides simple trouble free operation for its entire lifetime. Furthermore, the diffraction voltmeter has a high impedance and thus does not affect the voltage source being measured when it is connected in parallel with the load impedance of such voltage source. In addition, a diffraction voltmeter made in accordance with one embodiment of the present invention is provided with a plurality of different voltage ranges by moving the electron beam between a plurality of diffraction members which may be made of different materials having different diffraction angles for the same voltage applied to the specimen or may be made of different thicknesses of the same material.

It is therefore one object of the present invention to provide an improved D.C. voltmeter which employs electron diffraction to indicate the value of the voltage being measured.

Another object of the invention is to provide an improved high voltage D.C. voltmeter having a simple structure which is inexpensive to manufacture.

A further object of the present invention is to provide an electron diffraction voltmeter which is extremely accurate in the measurement of high D.C. voltages.

An additional object of the invention is to provide an electron diffraction voltmeter having no moving parts which operates in a simple trouble free manner and has a long useful lifetime.

Still another object of the present invention is to provide a high voltage D.C. voltmeter which requires no calibration by the operator to maintain its accuracy.

A still further object of the invention is to provide an electron diffraction voltmeter which provides a plurality of different voltage ranges by selecting one of a plurality of different diffraction members for diffracting the electron beam of such voltmeter.

Other objects and advantages of the present invention will be apparent from the following detailed description of certain preferred embodiments thereof and from the attached drawings of which:

FIG. 1 is a sectional view of one embodiment of the electron diffraction voltmeter of the present invention;

FIG. 2 is a plan view of the face plate of the tube of FIG. 1 showing the image of one diffraction ring of a polycrystalline diffraction member produced on the fluorescent screen of such tube;

FIG. 3 is an enlarged sectional view showing the diffraction member holder employed in the electron diffraction voltmeter tube of FIG. 1;

Figure 4:
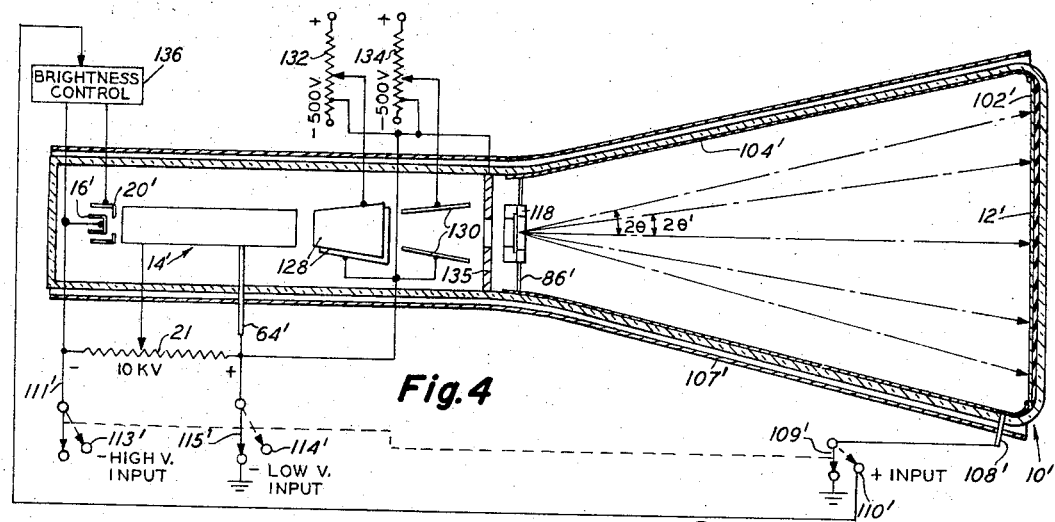
FIG. 4 is a schematic view of another embodiment of an electron diffraction voltmeter tube in accordance with the present invention.

One embodiment of the electron diffraction voltmeter of the present invention is shown in FIG. 1 to be in the form of a cathode ray tube having an evacuated glass envelope 10 with a fluorescent screen 12 of phosphor material coated on the inner surface of the face plate portion of such envelope at one end of the tube. An electron gun structure 14 is mounted inside the envelope 10 at the opposite end of the tube from the phosphor screen 12. An electron diffraction member 15 of known polycrystalline material, such as gold foil, is supported between the electron gun and the phosphor screen so that the electron beam produced by such gun is transmitted through the diffraction member onto the screen after a portion of such beam is diffracted into a plurality of coaxial cones of electrons which form a plurality of concentric diffraction rings on such screen.

The electron gun 14 includes a cathode 16 which may be connected to a source of regulated negative D.C. voltage of about −10,000 volts when the diffraction member is grounded, and is of the indirectly heated type having a separate filament heater 18. The cathode is suitably mounted in a conventional manner within the cup of a control grid 20 connected to a source of regulated negative D.C. voltage of about −10,050 volts. The grid cup 20 is supported inside an annular spacer ring 22 of alumina ceramic or other insulating material and this spacer ring is supported inside one end of a cylindrical inner support tube 24 of stainless steel or other suitable metal which is internally threaded at both ends thereof. The grid spacer ring 22 is prevented from axial movement by mounting such ring between a cylindrical spacer sleeve 26 of metal positioned within the inner support tube in contact with the inner surface of such tube, and a tubular shield member 28 having external threads on its smaller diameter end which are in engagement with the threads on one end of the inner support tube 24 so that such shield member functions in the manner of a retaining ring to hold the spacer ring within the tube. The shield member 28 surrounds the electrical leads of the heater 18, the cathode 16 and the grid 20 extending from the metal pins 27 through the base of the envelope and a socket 29 secured to such base, to prevent the potential of such leads from distorting the electrostatic field within the acceleration and focusing lens anodes of the electron gun.

The electron gun structure 14 also contains a first anode 30 of stainless steel or other metal which is formed by a pair of cup-shaped end members 32 and 34 having central apertures therethrough and joined by a hollow cylindrical intermediate member 36 whose opposite ends are threaded into members 32 and 34. The first anode 30 is supported with the apertures of end members 32 and 34 in axial alignment with the aperture of the grid cup 20 between a pair of annular spacer rings 38 and 40 of alumina ceramic or other suitable insulating material which engage two shoulders on the exterior surface of the anode end members between the spacer rings to prevent the first anode from moving with respect to such spacer rings. The spacer rings 38 and 40 are positioned inside the inner support tube 24 with their outer surfaces in contact with the inner surface of such tube. The spacer ring 38 is mounted in engagement with the spacer sleeve 26 to prevent the first anode 30 from moving out of the left end of the support tube 24, while the other spacer ring 40 is in engagement with another metal spacer sleeve 42. The spacer sleeve 42 is prevented from moving out of the right end of the inner support tube 24 by means of a focusing electrode 44 which is threaded into the end of the support tube and acts as a retaining ring. This focusing electrode 44 is in the form of an annular ring of stainless steel having a large circular aperture therethrough with rounded edges. The electron beam is focused by the focusing electrode on a spot at the center of the fluorescent screen 12 which also causes the diffraction rings produced on such screen to be in sharp focus. The focusing electrode is electrically connected through the inner support tube 24, the shield member 28 and one of the pins 27 to a movable contact on potentiometer 21 for varying its voltage to compensate for different voltages applied between the cathode 16 and the diffraction member 15, to focus the electron beam transmitted through the first anode 30 into a narrow beam of substantially circular cross section.

The inner support tube 24 is in turn supported by an outer support tube 46 of stainless steel or other suitable metal between a pair of annular spacer rings 48 and 50 of alumina ceramic or other suitable insulating material. The inner tube is inserted through openings in the spacer rings 48 and 50 and is provided with a pair of annular shoulders which each engage one such spacer ring to prevent movement of the inner tube with respect to such spacer rings. These spacer rings are positioned inside the outer support tube 46 with their outer surfaces in sliding contact with the inner surface of such outer support tube, and are held in fixed position by means of a pair of metal spacer sleeves 52 and 54 positioned within the outer support tube. The spacer sleeves 52 and 54 each have one end in engagement with one of the spacer rings 48 and 50, respectively, on the side of such ring opposite that engaging the shoulder on the inner support tube.

The right end of the outer support tube 46 is provided with an annular inwardly projecting flange 56 which serves as a stop for engagement with an annular spacer ring 58 of alumina ceramic or other suitable insulating material. Another metal spacer sleeve 60 is positioned inside the support tube 46 on the opposite side of spacer ring 58 to support a second anode 62 inside such support tube between such spacer sleeve and the spacer sleeve 54. This second anode 62 is in the form of a flat annular disc having a small circular aperture in the center thereof and is made of stainless steel or other suitable metal. The outer edge of the second anode lens engages the metal spacer sleeves 54 and 60 as well as the outer support tube 46 so that it is electrically connected through these members to the positive end terminal of potentiometer 21 by means of a lead pin 64 which extends through the side of the neck portion of the glass envelope 10 and is electrically connected to the outer support tube. The first anode 30 is also electrically connected to the outer support tube 46 by means of a contact plunger 66 which is mounted for sliding movement within a tubular plunger housing 68 so that one end of such plunger extends through a small aperture in the end of such housing. The plunger is urged into engagement with the inner surface of outer support tube 46 by means of a coil spring 70 positioned within the housing between the other end of the plunger and the bottom of such housing. The plunger housing 68 extends through a large aperture 72 in the side of the inner support tube 24 and is threaded onto an anode contact member 74 which in turn is threaded into a small opening in the intermediate member 36 forming a part of the first anode 30. Thus, the voltage applied to the lead pin 64 is also transmitted through the outer support tube 46, the plunger member 66, the coil spring 70 and the lens contact 74 to the first anode 30 so that such first anode is maintained at the same potential as the second anode 62 but at a different potential than the focusing electrode 44. This entire electron gun assembly is held inside the outer support tube 46 by a retaining ring 76 which is screw threaded inside the left end of the outer support tube into contact with the spacer sleeve 52.

The electron gun assembly 14 is supported inside the envelope 10 by means of two groups of leaf springs 78 attached to the opposite ends of the outer support tube 46 by welding or the like. These springs 78 extend outwardly into engagement with the inner surface of the neck portion of the envelope to space the outer support tube a small distance from such envelope.

A diffraction member holder 80 which may be in the shape of a cylindrical member of stainless steel having an external flange 81 at one end and external threads on the other end thereof is mounted inside the aperture of the spacer ring 58 between the electron gun assembly and the fluorescent screen 12. Thus, the electrons emitted by the cathode 16 are formed into a beam by the electrostatic lens provided by electrodes 30, 44 and 61, and this beam is transmitted through the diffraction member 15 supported inside a passageway 82 extending axially through such holder onto such fluorescent screen. The holder 80 is attached to the spacer ring 58 by a metal retaining ring 84 which is threaded onto the outer surface of one end of such holder on the opposite side of the spacer ring from the external flange 81. A shield member 86 in the form of an annular ring of stainless steel having external threads on an inner flange extending from the side therof is threaded into the retaining ring 84. The outer diameter of the shield ring 86 is substantially the same as that of the outer support tube 46 and prevents any electrostatic field inside such outer support tube from penetrating into the space between the diffraction member and the fluorescent screen. The aperture through such shield member is in alignment with the passageway 82 in the holder to enable electrons passing therethrough to be transmitted through the shield member to the fluorescent screen 12 even when such electrons are diffracted through large angles by the diffraction member.

As shown in FIG. 3, the holder 80 contains a diaphragm 88 having a circular central aperture therethrough which is in alignment with the axis of passageway 82 when such diaphragm engages an annular internal shoulder 90 of such holder. This diaphragm is provided with a circular notch 92 in its front surface around its aperture for receiving the edges of the circular diffraction member 15 of metal foil, such as gold, or other polycrystalline electrically conductive material. This foil diffraction member may be supported on a wire mesh or a film of collodion, a thermoplastic resin made from polyvinyl alcohol under the trademark "Formvar" or other suitable material, and is held in place by means of a clamping disc 96. The clamping disc has a circular central aperture therethrough of substantially the same diameter as the aperture through diaphragm 88 and has a small annular flange projecting from one side of such disc which is slightly smaller in diameter than the notch 92 of such diaphragm to enable such flange to engage the diffraction member in such notch to clamp such diffraction member between the diaphragm and the disc. An annular retaining ring 98 having external threads is screwed inside the holder 80 with such threads engaging internal threads on the inner surface of the holder surrounding the large diameter portion of passageway 82 to hold the clamping disc 96, the diffraction member 15 and the diaphragm 92 within the holder. This retaining ring may be provided with a pair of slots 100 on opposite sides thereof for receiving the blade of a screw driver or like tool to enable easy fastening and removal. The retaining ring 98 is also provided with a large diameter central opening which is of sufficient size to allow the electrons passing through the diffraction member to be transmitted to the fluorescent screen.

As shown in FIG. 1, the fluorescent screen 12 may be provided with a thin electron transparent coating 102 of aluminum or other metal to reflect the light emitted from the phosphor screen 12 in response to electron bombardment thereof in order to increase the brightness of the light image of the diffraction rings. This reflective coating 102 is electrically connected to the diffraction member holder 80 by means of a wall coating 104 of aquadag or other suitable conductive material on the inner surface of the funnel portion of the envelope since such wall coating overlaps the reflective coating 102 at the edge of the fluorescent screen and is engaged by spring contacts 106 welded to the periphery of the shield member 86. It should be noted that the shield member 86, the retaining ring 84 and the holder 80, diaphragm 88 and clamping disc 96 are all made of stainless steel or other suitable metal so that the diffraction member is connected to the same voltage as the wall coating 104 and the reflective coating 102. Thus, there exists a region between the diffraction member 15 and the fluorescent screen 12 which is free from any electrical field. While the effect of the earth's magnetic field is small it may also be desirable to provide a magnetic shield 107 of mu metal around the tube envelope to prevent any magnetic field from existing inside the envelope in the region. This enables the diffracted electrons emitted from the diffraction member to travel in straight line paths to the fluorescent screen which is necessary for accuracy of the voltmeter for reasons hereafter described.

An electrical lead which may be in the form of a metal pin 108 is brought through the side of the funnel portion of the envelope into contact with the conductive wall coating 104 so that such wall coating and the elements electrically connected thereto, including the diffraction member 15, may be initially connected by means of a two position switch 109 to an electrical reference potential on one of the fixed switch contacts which in FIG. 1 is ground. The cathode 16 may be connected to a negative D.C. supply voltage of about $-10,000$ volts at one end of potentiometer 21 so that electrons emitted by such cathode are accelerated by the potential difference between the cathode and diffraction member, are transmitted through such member and diffracted onto the fluorescent screen. These diffracted electrons produce a diffraction pattern in a form of a plurality of concentric annular rings on the fluorescent screen 12, only one of which is shown in FIG. 2. The unknown D.C. input voltage may be applied between a positive input terminal 110 which is connected by the movable contact of switch 109 to the diffraction member 15, and a negative high voltage input terminal 113 which is connected by the movable contact of a switch 111 to the cathode 16. This increases or decreases the voltage between the cathode and such diffraction member so that the impact velocity of the electron beam is also changed and causes the diameter of the diffraction ring 112 to change by an amount depending on such input voltage. It should be noted that low input voltages may be applied between the positive input terminal 110 and a negative low voltage input terminal 114 connected to the second anode 62 by the movable contact of a two position switch 115. This adds the input voltage to the 10 kv. supply voltage and enables low input voltages to be measured which by themselves are not sufficient to produce a diffraction ring.

In addition to the diffraction ring image 112, a circular spot 116 will also appear in the center of such diffraction ring due to the fact that a portion of the electron beam is transmitted through the diffraction member without being diffracted. This spot may serve as a reference point so that the radius $r$ of the diffraction ring 112 could be measured from such spot to such ring as indicated in FIG. 2. However, in practice, this is not possible because the center spot is so bright that it decreases the contrast of the diffraction rings and produces a "halo effect" about the spot due to light scattering. This may be eliminated by removing a portion of the phosphor screen in the region of the center spot or by increasing the thickness of the aluminum layer 102 in this region to prevent the passage of electrons through such layer. It should be noted that while several diffraction rings are produced simultaneously, some of these rings will not be of sufficient brightness or separated from the other rings to enable accurate measurement of their diameter. However, it is always possible to obtain at least one diffraction ring whose image line is suitable for measurement.

When an unknown D.C. input voltage is applied between input terminal 110 and input terminal 113 or 114 the diameter of the diffraction ring image 112 changes so that its radius increases or decreases depending upon the magnitude of the input voltage on input terminal 110. It will be shown that the radius of this diffraction ring 112 is a direct indication of the D.C. voltage applied between the cathode and the diffraction member from which the unknown D.C. input voltage applied to input terminal 110 can be computed.

As the electrons pass through the diffraction member 15, they are diffracted in accordance with Bragg's Law:

$$\lambda = 2d \sin \theta \qquad \text{(Equation 1)}$$

to produce the diffraction ring pattern 112 on the fluorescent screen 12. The wave length $\lambda$ of the electron beam varies with the total accelerating voltage V between the cathode 16 and the diffraction member 15 in accordance with the equation:

$$\lambda = \frac{h}{\sqrt{2meV}} \quad \text{(Equation 2)}$$

where $m$ is the mass and $e$ is the charge of an electron and $h$ is Planck's constant. When the expression of Equation 2 is substituted for wave length in Equation 1 the relationship may be shown as $$\text{sine } \theta = \frac{h}{2d\sqrt{2meV}} \quad \text{(Equation 3)}$$

The radius $r$ of the diffraction ring is related to the diffraction angle $\theta$ by the equation:

$$\tan 2\theta = r/s \quad \text{(Equation 4)}$$

where $s$ is the distance between the diffraction member and the phosphor screen and $2\theta$ is the angle between the straight line paths of the diffracted portion of the electron beam and the undiffracted portion of such beam, as shown in FIG. 1. Since for small angles of $2\theta$ the tangent of $2\theta$ is approximately equal to the sine of $2\theta$ or 2 times the sine of $\theta$, the expression of Equation 3 can be multiplied by 2 and substituted for $\tan 2\theta$ in Equation 4 to obtain the following relationship:

$$\frac{r}{s} = \frac{2h}{2d\sqrt{2meV}} \quad \text{(Equation 5)}$$

Equation 5 can be shown to be the same as, $$V = \frac{s^2 h^2}{r^2 2d^2 me} \quad \text{(Equation 6)}$$

The crystal spacing $d$ is known for the diffraction material employed as is the distance $s$. Therefore, Equation 6 may be reduced to:

$$V = K/r^2 \quad \text{(Equation 7)}$$

when K is a known constant.

The unknown input voltage $V_x$ applied between the input terminals 110 and 114 may be determined first by dividing the constant K by the diffraction ring radius $r_2$ squared to get the total voltage $V_2$ between the diffraction member and the cathode, and then by substracting from $V_2$ the reference voltage $V_1$ initially applied between such member and such cathode with no input voltage, or:

$$V_2 = \frac{K}{(r_2)^2} \text{ and } V_1 = \frac{K}{(r_1)^2}$$

$$V_x = V_2 - V_1$$

As stated above, high input voltages may be applied between the cathode and the diffraction member. In this case, the total voltage V of Equation 7 above, is equal to the unknown input voltage.

It should be noted that the above equations must be corrected for the increase in mass of the electron when its velocity approaches the speed of light at high input voltages. Thus, Equation 2 must be changed to:

$$\lambda = \frac{h}{\sqrt{2m_0 eV\left(1 + \frac{eV}{2m_0 c^2}\right)}}$$

(Equation 2')

where $m_0$ is the mass of the electron at rest and $c$ is the speed of light. When the correction for the theory of relativity is carried forward into the subsequent equations, it changes Equation 7 to:

$$V\left(1 + \frac{eV}{2m_0 c^2}\right) = \frac{K}{r^2}$$

Since $2m_0 c^2$ is approximately equal to $10^{+6}$ electron-volts, the preceding equation can be simplified to:

$$V\left(1 + \frac{V}{10^6}\right) = \frac{K}{r^2}$$

Also, for values of voltage V which are small compared to $10^{+6}$ volts, this equation may be rewritten as:

$$V = V_0\left(1 - \frac{V_0}{10^{+6}}\right) \quad \text{(Equation 7')}$$

where $V_0$ is the value of the voltage calculated non-relativistically according to Equation 7. The relativistic correction factor can be significant and must be used to obtain measurements of high accuracy. For example, when $V_0$ is calculated ot be 20 kilovolts the correction factor $V_0^2/10^6$ is equal to 400 volts, or 2% of $V_0$, and the corrected voltage V is 19.6 kilovolts.

Figure 6:
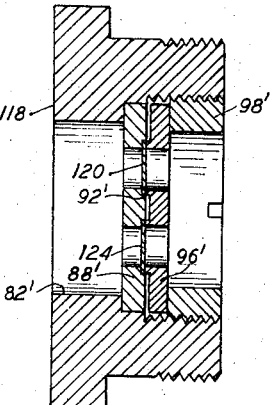
FIG. 6 is a vertical section view taken along the line 6—6 of FIG. 5.
Figure 5:
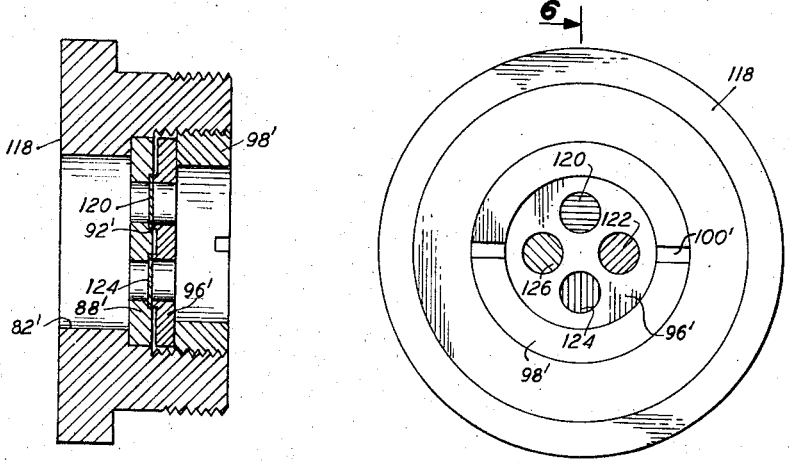
FIG. 5 is an enlarged plan view of a diffraction member holder employed in the tube of FIG. 4 to support a plurality of different diffraction members.

As shown in FIG. 4, it may be desirable to provide a cathode ray tube similar to the tube of FIG. 1 but employing a different diffraction member holder 118. This holder contains a plurality of different diffraction members 120, 122 124 and 126, as shown in FIGS. 5 and 6, which may be made of different thicknesses or different polycrystalline conductive materials such as gold, aluminum, silver, copper, etc. that can be made in thin foils and have different diffraction patterns, so that they may be employed to provide a plurality of different voltage ranges for the voltmeter tube. The holder 118 may be made of stainless steel in a manner similar to the holder of FIG. 1. Thus, the holder contains a diaphragm 88' which is provided with four apertures and four surrounding notches 92', and a clamping disc 96' which is also provided with four apertures and rearwardly projecting flanges surrounding such apertures to mate with the notches in the diaphragm. The passageway 82' within the holder is enlarged as is the opening in the retaining ring 98' to. allow movement of the electron beam onto each of the diffraction members and to enable the diffracted electrons to reach the fluorescent screen. A pair of horizontal deflection plates 128 and a pair of vertical deflection plates 130 may be provided between the electron gun 14' and the holder 118 in order to position the electron beam on different ones of the diffraction members 120, 122, 124 and 126. Since these deflection plates are only used for positioning, they may be short and will not increase the overall size of the tube substantially. One of the horizontal deflection plates 128 and one of the vertical deflection plates may be connected respectively to the movable contacts of two different potentiometers 132 and 134 which are connected across a suitable source of regulated D.C. supply voltage of about 500 volts which is floating with respect to ground in order to vary the voltage applied to such plates to change the position of the electron beam. An apertured shield electrode 135 may be positioned between the deflection plates and the specimen holder to prevent such plates from distorting the accelerating field. This shield electrode, the fixed taps of potentiometers 132 and 134, and one plate of each pair of deflection plates 128 and 130 are all connected to the positive terminal of the floating power supply across potentiometer 21'.

As indicated above, when a given D.C. input voltage is applied to the input terminal 110' and transmitted through wall coating 104' to the holder 118, the electron beam passing through one of the diffraction members, for example member 120, is diffracted through an angle of $2\theta$. If the diameter of the diffraction ring on the fluorescent screen 12' is made too large or too small by the input voltage for accurate measurement of the ring radius, the electron beam can be shifted to a second diffraction member, for example member 124, so that electrons of such beams are diffracted through a different angle $2\theta'$. This might also be done if the diffraction member is too thick to allow the electron beam to pass through it at lower voltages, or is too thin to produce a suitable bright diffraction ring on the screen. Thus, the plurality of diffraction members enable the electron diffraction voltmeter of FIGS. 4 and 6 to measure a larger range of voltages than would be possible with a single diffraction member.

The remainder of the cathode ray tube of FIG. 4 is similar to that of the tube of FIG. 1, except that the electron gun structure 14' does not support the holder 118 due to the presence of the deflection plates. It may be desirable to provide a brightness control circuit 136 between the control grid 20' and the cathode 16' of the electron gun in order to maintain the brightness of the diffraction ring image constant by compensating for different values of accelerating voltage applied to the holder 118. This brightness control circuit 136 could be, for example, a voltage comparator amplifier whose output voltage is controlled by the voltage applied to input terminal 110' so that the negative D.C. bias voltage on the control grid 20' increases and tends to reduce the image brightness when the positive D.C. input voltage on the diffraction member increases tending to cause greater brightness. It should be noted further that the diffraction voltmeter of the present invention may be provided in a conventional cathode ray tube in a cathode ray oscilloscope. In this case the diffraction member is positioned off the axis of the tube so that it is not struck by the beam when signals are applied to the deflection plates to operate the tube in a conventional manner.

It will be obvious to those having ordinary skill in the art that various changes may be made in the details of the above described preferred embodiment of the present invention without departing from the spirit of the invention. For example, the diffraction member can be made of electrical insulative material rather than conductive material, if a holder of conductive material is employed, because such a diffraction member is charged to the potential of its holder when the electron beam strikes the insulative material apparently due to secondary electron emission. Of course, the use of a metal support mesh for the insulative diffraction member would have a similar effect. Single crystalline diffraction members can be employed in place of polycrystalline members, even though such single crystalline members do not produce diffraction rings but instead produce a plurality of spots arranged in the manner of a crossed grating diffraction pattern so that the distance between spots varies with the voltage applied to the diffraction member. In this regard, the single crystalline diffraction members may be made of insulator material such as mica or semiconductor material such as germanium or silicon and the electron beam may be diffracted from one side of the diffraction member without passing completely through it. The fluorescent screen could be replaced by any type of detector which produces an electrical signal when bombarded by the diffracted electrons. It is also possible to form the diffraction member of powdered single crystalline material, such as mica, supported in a thin layer on a plastic plate since the randomly oriented particles of such powder give a ring diffraction pattern similar to polycrystalline material. Of course, the 10 kv. power supply applied across potentiometer 21 may be eliminated if it is desired to use only the unknown test voltage to provide the accelerating potential between the cathode 16 and the second anode 62. Furthermore, it may be desirable to employ a demountable vacuum system similar to an electron microscope, rather than a conventional cathode ray tube, so that the diffraction members can be replaced when they are damaged. Also, it may be desirable to provide an external or internal graticule scale which incorporates the relativistic correction factor when giving the diameter of the diffraction rings to automatically provide the correct voltage. Therefore, the scope of the present invention should only be determined by the following claims.

I claim:
1. An electron diffraction voltmeter, comprising:
indicator means for indicating when electrons strike said indicator means;
a soure of electrons;
an electron diffraction member of crystalline material;
means for supporting said diffraction member between said source and said indicator means;
means for focusing said electrons into a beam and for directing said beam onto said diffraction member so that at least some of the electrons in said beam are diffracted through a diffraction angle by said diffraction member onto said indicator means;
means for applying different D.C. input voltages between said source of electrons and said diffraction member to change the velocity of said electrons so that they are diffracted through different diffraction angles to change the size of the diffraction pattern formed on said indicator means by the diffracted electrons which provides an indication of the amplitude of the input voltage applied to said diffraction member.

2. An electron diffraction voltmeter, comprising:
a fluorescent screen;
a source of electrons;
an electron diffraction member of crystalline material;
means for supporting said diffraction member between said source and said fluorescent screen;
lens means for focusing said electrons into a beam and for directing said beam onto said diffraction member so that at least some of the electrons in said beam are diffracted by said diffraction member;
shield means for preventing any electrical field from existing in the path of the electrons from the diffraction member to the fluorescent screen for transmitting the diffracted electrons in substantially straight line paths onto said screen to form a light image of the diffraction pattern of the diffracted electrons; and
input means for applying different unknown D.C. input voltages between said source of electrons and said diffraction member to change the velocity of said electrons so that they are diffracted through different diffraction angles to change the size of the diffraction pattern and to provide an indication of the amplitude of the input voltage applied to said diffraction member.

3. An electron diffraction voltmeter, comprising:
an evacuated envelope;
a phosphor screen supported within said envelope;
a source of electrons supported within said envelope remote from said screen;
an electron diffraction member of polycrystalline electrical conductive material supported within the envelope between said source of said phosphor screen;
means for focusing said electrons into a beam and for directing said beam onto said diffraction member so that at least some of the electrons in said beam are diffracted through a diffraction angle by said diffraction member;
means for shielding the region inside the envelope between the diffraction member and the screen from electrical and magnetic fields to enable the transmission of the electrons in substantially straight line paths from said diffraction member onto said screen to form a light image of an annular diffraction ring of the diffracted electrons; and
means for applying different D.C. input voltages to said diffraction member to change the velocity of said electrons so that they are diffracted through different diffraction angles to change the diameter of the diffraction ring image and to provide an indication of the amplitude of the input voltage applied to said diffraction member.

4. An electron diffraction voltmeter, comprising:
an evacuated envelope;
a phosphor screen supported inside said envelope;
a source of electrons supported inside said envelope spaced from said screen;
a thin foil diffraction member of polycrystalline metal supported inside the envelope between said source and said phosphor screen;

means for focusing said electrons into a beam and for directing said beam onto said diffraction member so that at least some of the electrons in said beam are transmitted through the diffraction member and are diffracted by said diffraction member;

shield means for preventing any appreciable electrical field from existing in the region between said diffraction member and said screen inside the envelope for transmitting the diffracted electrons in substantially straight line paths from said diffraction member onto said phosphor screen to form a light image of an annular diffraction ring of the diffracted electrons;

means for applying different D.C. input voltages to said diffraction member to change the velocity of said electrons so that they are diffracted through different diffraction angles to change the diameter of the diffraction ring image and to provide an indication of the amplitude of the input voltage applied to said diffraction member; and means for maintaining the brightness of the diffraction ring image substantially constant regardless of changes in voltage on said diffraction member.

5. A cathode ray tube for measuring high D.C. voltages by electron diffraction, comprising:

an evacuated envelope having a light transparent face plate;

a phosphor screen supported on the inner surface of said face plate;

an electron gun structure mounted within said envelope to produce a beam of electrons, said gun structure including a cathode, a control grid, and a plurality of focusing and accelerating electrodes;

a diffraction member holder supported within said envelope between said gun structure and said phosphor screen;

a diffraction member of crystalline material mounted in said diffraction member holder so that said electrons are transmitted through the diffraction member and diffracted onto the phosphor screen to produce at least one annular diffraction ring on said screen; and means for applying different D.C. input voltages between said cathode and said diffraction member holder so that the diameter of the diffraction ring varies with different input voltages to indicate the value of said input voltages.

6. A cathode ray tube for measuring high D.C. voltages by electron diffraction, comprising:

an evacuated envelope having a funnel portion and a light transparent face plate portion;

a phosphor screen supported on the inner surface of said face plate;

an electron transparent, light reflecting layer of conducting material coated over the rear surface of the phosphor screen;

an electron gun structure mounted within said envelope to produce a beam of electrons, said gun structure including a cathode, a control grid, and a plurality of focusing and accelerating electrodes;

a diffraction member holder supported within said envelope between said gun structure and said phosphor screen;

a thin electron transparent diffraction member of polycrystalline electrical conductive material supported by said diffraction member holder;

a wall coating of electrical conducting material coated on the inner surface of said funnel portion of said envelope in contact with the light reflecting layer over the phosphor screen;

means for connecting the diffraction member holder to said wall coating to shield the region within the envelope between said diffraction member and the phosphor screen from electrical fields so that electrons transmitted through the diffraction member and diffracted thereby are transmitted in substantially straight line paths from the diffraction member to said phosphor screen to form a light image of an annular diffraction ring of the diffracted electrons; and means for applying different unknown D.C. input voltages to said diffraction member so that the diameter of the diffraction ring image varies with different input voltages to indicate the value of said input voltages.

7. A cathode ray tube for measuring high D.C. voltages by electron diffraction, comprising:

an evacuated envelope having a light transparent face plate;

a phosphor screen supported on the inner surface of said face plate;

an electron gun structure mounted within said envelope to produce a beam of electrons, said gun structure including a cathode, a control grid, and a plurality of focusing and accelerating electrodes;

a diffraction member holder supported within said envelope between said gun structure and said phosphor screen;

a plurality of thin, electron transparent diffraction members of different polycrystalline metals supported in spaced relationship by said diffraction member holder;

means for deflecting said electron beam onto different ones of said diffraction members to transmit the electrons of said beam through one of the diffraction members so that at least some of said electrons are diffracted by said diffraction member through a diffraction angle;

shield means for preventing any electrical field from existing in the region inside said envelope between the diffraction member and the phosphor screen to enable the diffracted electrons to be transmitted in substantially straight line paths from the diffraction member to said phosphor screen to form a light image of an annular diffraction ring of the diffracted electrons; and means for applying different D.C. input voltages to said diffraction members so that the diameter of the diffraction ring image varies with different input voltages to indicate the value of said input voltages.

8. A cathode ray tube for measuring high D.C. voltages by electron diffraction, comprising:

an evacuated envelope having a funnel portion and a light transparent face plate portion;

a phosphor screen supported on the inner surface of said face plate;

an electron transparent, light reflecting layer of conducting material coated over the rear surface of the phosphor screen;

an electron gun structure mounted within said envelope to produce a beam of electrons, said gun structure including a cathode, a control grid, and a plurality of focusing and accelerating electrodes;

a diffraction member holder supported within said envelope between said gun structure and said phosphor screen;

a plurality of thin, electron transparent diffraction members of different polycrystalline metals supported in spaced relationship by said diffraction member;

means for deflecting said electron beam onto different ones of said diffraction members to transmit the electrons of said beam through one of the diffraction members so that at least some of said electrons are diffracted by said diffraction member through a diffraction angle;

a wall coating of electrical conductive material coated on the inner surface of the funnel portion of the envelope in contact with the light reflecting layer over the phosphor screen;

means for connnecting the diffraction members to said wall coating to shield the region inside the envelope between the diffraction members and phosphor screen from electrical fields so that the diffracted electrons are transmitted in substantially straight line paths from said one diffraction member to said phosphor screen to form a light image of an annular diffraction ring of the diffracted electrons;

means for applying different D.C. input voltages to said diffraction members so that the diameter of the diffraction ring image varies with different input voltages to indicate the value of said input voltages; and means for maintaining the brightness of the diffraction ring image substantially constant regardless of changes in the voltage applied to the diffraction members.

References Cited

UNITED STATES PATENTS 1,962,873  6/1934  Parker _____ 324—121

OTHER REFERENCES

Hall, Cecil E., Introduction to Electron Microscopy, p. 301, 1953, McGraw-Hill Book Co.

RUDOLPH V. ROLINEC, *Primary Examiner.*

WALTER L. CARLSON, *Examiner.*

E. F. KARLSEN, *Assistant Examiner.*